United States Patent
Robinson

(10) Patent No.: US 7,559,317 B2
(45) Date of Patent: Jul. 14, 2009

(54) INTERNAL COMBUSTION ENGINE WITH SINGLE-PORT HOLDING TANK FOR ELEVATED EXPANSION RATIO

(76) Inventor: Barnett Joel Robinson, 227 California St., Newton, MA (US) 02458

( * ) Notice: Subject to any disclaimer, the term of this patent is extended or adjusted under 35 U.S.C. 154(b) by 102 days.

(21) Appl. No.: 11/810,908

(22) Filed: Jun. 7, 2007

(65) Prior Publication Data

US 2008/0035105 A1 Feb. 14, 2008

Related U.S. Application Data

(63) Continuation-in-part of application No. 11/409,753, filed on Apr. 24, 2006, now Pat. No. 7,322,321.

(51) Int. Cl.
*F02B 47/08* (2006.01)
*F02M 25/07* (2006.01)
(52) U.S. Cl. .................. 123/568.13; 123/58.8
(58) Field of Classification Search ............... 123/58.8, 123/568.13, 48 A, 48 AA, 48 D, 285–286, 123/292, 568.11, 568.14
See application file for complete search history.

(56) References Cited

U.S. PATENT DOCUMENTS

| | | | |
|---|---|---|---|
| 3,878,826 A | 4/1975 | Date | |
| 4,192,265 A | 3/1980 | Amano | |
| 4,282,845 A * | 8/1981 | Nohira et al. | 123/433 |
| 5,201,907 A * | 4/1993 | Hitomi et al. | 123/48 D |
| 6,178,933 B1 * | 1/2001 | Lavy | 123/58.8 |
| 6,328,003 B1 * | 12/2001 | Gaertner et al. | 123/58.8 |
| 6,427,644 B1 * | 8/2002 | Dabadie et al. | 123/58.8 |
| 6,769,393 B2 * | 8/2004 | Widener et al. | 123/316 |
| 6,848,413 B1 * | 2/2005 | Suder et al. | 123/286 |
| 6,880,517 B1 * | 4/2005 | Hwang | 123/254 |
| 6,907,859 B1 | 6/2005 | Robinson | |
| 7,028,648 B2 * | 4/2006 | Hasegawa et al. | 123/58.8 |
| 7,322,321 B2 * | 1/2008 | Robinson | 123/48 R |
| 7,357,125 B2 * | 4/2008 | Kolavennu | 123/568.11 |
| 2008/0087257 A1 * | 4/2008 | Robinson | 123/568.13 |

* cited by examiner

*Primary Examiner*—Hai H Huynh

(57) ABSTRACT

An internal combustion engine, having a cylinder with a translating piston therein, employs a holding tank connecting, via a valve, to the combustion chamber of the cylinder for receipt of a portion of the engine gasses expelled during a compression stroke for providing that the expansion ratio of an expansion stroke is greater than the compression ratio of the compression stroke. The holding tank is located within a head of the cylinder, and has a single port serving for both ingress and egress of gasses to the combustion chamber. The holding tank is provided with one or more additional passages for connection to one or more additional cylinders in the event that the holding tank is shared among two or more cylinders.

17 Claims, 4 Drawing Sheets

INTERNAL COMBUSTION ENGINE WITH SINGLE-PORT HOLDING TANK FOR ELEVATED EXPANSION RATIO

RELATED APPLICATION

This application is a continuation-in-part of original application Ser. No. 11/409,753 filed Apr. 24, 2006 now U.S. Pat. No. 7,322,321.

FIELD OF THE INVENTION

This invention relates to an internal combustion engine having a cylinder with a translating piston therein, and employing a holding tank connecting, via a valve, to the combustion chamber of the cylinder for providing that the expansion ratio of an expansion (power) stroke is greater than the compression ratio of a compression stroke, and wherein the holding tank has a single port for ingress and egress of gasses to be used in the combustion process.

BACKGROUND OF THE INVENTION

An internal combustion engine, wherein an elevated expansion ratio is provided by utilization of a holding tank, is described in U.S. Pat. No. 6,907,859 of B. J. Robinson (Robinson), the inventor of the present invention. For appreciation of the present invention, it is useful to review the operations of the four-stroke form of the gasoline engine and the diesel engine, and particularly the description of the Robinson engine. Information on the construction of the engine, disclosed in the Robinson patent, is incorporated herein by reference.

In the four-stroke form of the gasoline engine, the movement of a piston in its cylinder is characterized by four strokes of the piston, in conjunction with operation of an intake valve and an exhaust valve generally located in the cylinder head. The four strokes occur in a repeating sequence, the sequence of the four strokes being: an induction stroke, a compression stroke, a power (or expansion) stroke, and an exhaust stroke. During the induction stroke, the piston moves away from the head of the cylinder to produce a vacuum that draws in a mixture of air and fuel vapors via the intake valve. During the compression stroke, the intake and the exhaust valves are closed, and the piston moves towards the cylinder head to compress the air-fuel mixture. Approximately at the beginning of the power stroke, there is ignition of the air-fuel mixture and, during the power stroke, the expanding gases produced by the combustion of the fuel drive the piston away from the cylinder head. During the exhaust stroke, the piston moves towards the cylinder head to drive the exhaust gases out of the cylinder via the exhaust valve. In the usual construction of such an engine, an intake manifold is provided for bringing air and fuel from a carburetor or fuel-injection assembly to the intake ports of the cylinders, and an exhaust manifold is provided for removal of combustion gases via exhaust ports of the cylinders.

It is useful to compare operation of the gasoline engine with the diesel engine. In the case of the gasoline engine, both fuel and air are present in the cylinder during the compression stroke. The temperature produced in the gases within the cylinder is below the ignition temperature of the air-fuel mixture so as to avoid premature ignition of the air-fuel mixture. Ignition is produced by an electric spark of a spark plug, mounted within the cylinder head. In a modern engine, activation of the spark plug at an optimum moment, relative to the time of occurrence of the power stroke, is provided by a computer. In the case of the diesel engine, only the air is present in the cylinder during the compression stroke. The geometry of the piston within the cylinder of the diesel engine differs somewhat from the corresponding geometry of the gasoline engine such that the compression stroke of the diesel engine provides significantly more compression of the gases within the cylinder (a compression ratio of approximately 15:1) than occurs in the gasoline engine (a compression ratio of approximately 8:1). As a result, in the diesel engine, the temperature of the air is raised by the compression stroke to a temperature high enough to ignite fuel. Accordingly, in the diesel engine, the fuel is injected into the cylinder at approximately the beginning of the power stroke, and is ignited by the high air temperature.

It is observed furthermore, that in the usual construction of a gasoline engine and of a diesel engine, the ratio of the expansion of the volume of cylinder gases, final volume divided by initial volume of the power stroke, is equal to the ratio of the compression of the volume of the cylinder gases, initial volume divided by final volume of the compression stroke, for engines without the feature of elevated expansion ratio provided in the Robinson patent. The expansion of the cylinder gases in the power stroke is accompanied by a reduction in the temperature of the cylinder gases. Well-known theoretical considerations show that an important consideration in determining the efficiency of the engine is the ratio of the gas temperature at the beginning of the power stroke to the gas temperature at the end of the power stroke. A greater temperature ratio is obtained in the case of the diesel engine than for the gasoline engine. This is one of the reasons that the diesel engine can operate more efficiently than the gasoline engine.

The engine of the Robinson patent includes, for each cylinder, an intake valve and an outlet valve, and furthermore includes a return valve and a discharge valve. The return valve closes and opens a passage between the internal space of a cylinder and its holding tank, and the discharge valve closes and opens a passage between the holding tank and a return manifold. In Robinson, the holding tank is formed within an arm of the return manifold, the return valve is located in a return port of the cylinder head at an outboard end of the manifold arm, and the discharge valve is located at the inboard end of the manifold arm adjacent to a central chamber of the return manifold. The function of the holding tank, in conjunction with the additional valves and the return manifold, is to give the engine an elevated expansion ratio while simultaneously being able to reduce the compression ratio for additional fuel savings. In the operation of the Robinson engine, gasses extracted from respective ones of the cylinders during a portion of the compression stroke (an air-fuel mixture in the case of a gasoline engine, and air in the case of a diesel engine) are recirculated via the respective holding tanks and the return manifold to be reinserted into the cylinders of the engine.

Other examples of engines employing additional manifolds and valves are presented in Date, U.S. Pat. No. 3,878,826, and Amano, U.S. Pat. No. 4,192,265.

SUMMARY OF THE INVENTION

An object of the invention is to facilitate construction of an internal combustion engine having a cylinder with a translating piston therein, and employing a holding tank connecting, via a valve, to the combustion chamber of the cylinder for providing that the expansion ratio of an expansion (power) stroke is greater than the compression ratio of a compression stroke.

This object and other advantages are obtained, in the invention, by providing the engine with a unitary construction of the valving and the holding tank of a cylinder within a housing of a valve assembly in a head of the cylinder, and also by constructing the holding tank with a single port, operative with a valve for communicating with the cylinder for ingress and egress of gasses to be used in the combustion process. In the case of an engine with plural cylinders extending into a common cylinder head, each of the holding tanks is located within the common cylinder head, and is provided with a single port and associated valve for communicating with a respective one of the cylinders for ingress and egress of combustion gasses. This single port and its associated valve, may be referred to as the "return port" and the "return valve" to use the nomenclature of the Robinson patent. In a preferred embodiment of the invention, the return valve associated with an individual one of the cylinders is opened during two strokes of the four stroke engine cycle, namely, (1) during a portion of the compression stroke for withdrawal of a portion of the cylinder gasses from the cylinder into the holding tank, and (2) during a portion of the next induction stroke for reinsertion of withdrawn gasses from the holding tank back into the cylinder. The return valve is closed during the expansion (power) stroke and during the exhaust stroke of the four-stroke cycle, thereby isolating the holding tank from the cylinder during the power stroke and the exhaust stroke. The intake and the exhaust valves are closed during the compression stroke.

Thus, in the practice of the invention, the engine is able to remove a portion of the cylinder gas during the compression stroke, via the holding tank, and to reinsert the portion of the cylinder gas back into the cylinder during the induction stroke. This is accomplished without use of a third manifold, namely the "return manifold" disclosed in Robinson, and without use of a fourth valve, namely the "discharge valve", disclosed in Robinson. This reduction in the number of components of the engine reduces the complexity of the engine, while retaining the feature of the elevated compression ratio, and enables all of the valving to be constructed as a valve assembly sharing a common housing that also contains the holding tanks associated with respective ones of the cylinders.

There is a further embodiment of the invention, useful for engines having a configuration of a plurality of cylinders, sharing a common cylinder head, and wherein their respective pistons operate in the four stroke engine cycle, and wherein (1) two of the pistons translate within their respective cylinders in unison such that both the first and the second pistons are moving towards the cylinder head concurrently, and (2) the operation of a second piston is delayed from the operation of the first piston by one half of the four stroke cycle. By way of example, the intake stroke of the first piston occurs concurrently with the power stroke of the second piston. This embodiment of the invention enables the two cylinders to share a single holding tank located within their common cylinder head. This feature of the invention provides for a still further reduction in the number of components of the engine to simplify construction of the engine, while retaining the feature of the elevated compression ratio, and also enables all of the valving to be constructed in a valve assembly sharing a common housing that also contains the holding tank shared by the two cylinders.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

A form of the internal combustion engine, generally used for powering automobiles, operates in accordance with the Otto cycle, and may be referred to herein as a gasoline engine, as distinguished from a diesel engine. The gasoline engine employs one or more cylinders, each cylinder having a piston movable therein with reciprocating motion for the driving of a crankshaft of the engine. Output power of the engine, for the driving of a load, is obtained from the rotating crankshaft. The invention is described now for the four-stroke form of the gasoline engine, and of the diesel engine, the construction of such engines having been described above.

Figure 1:
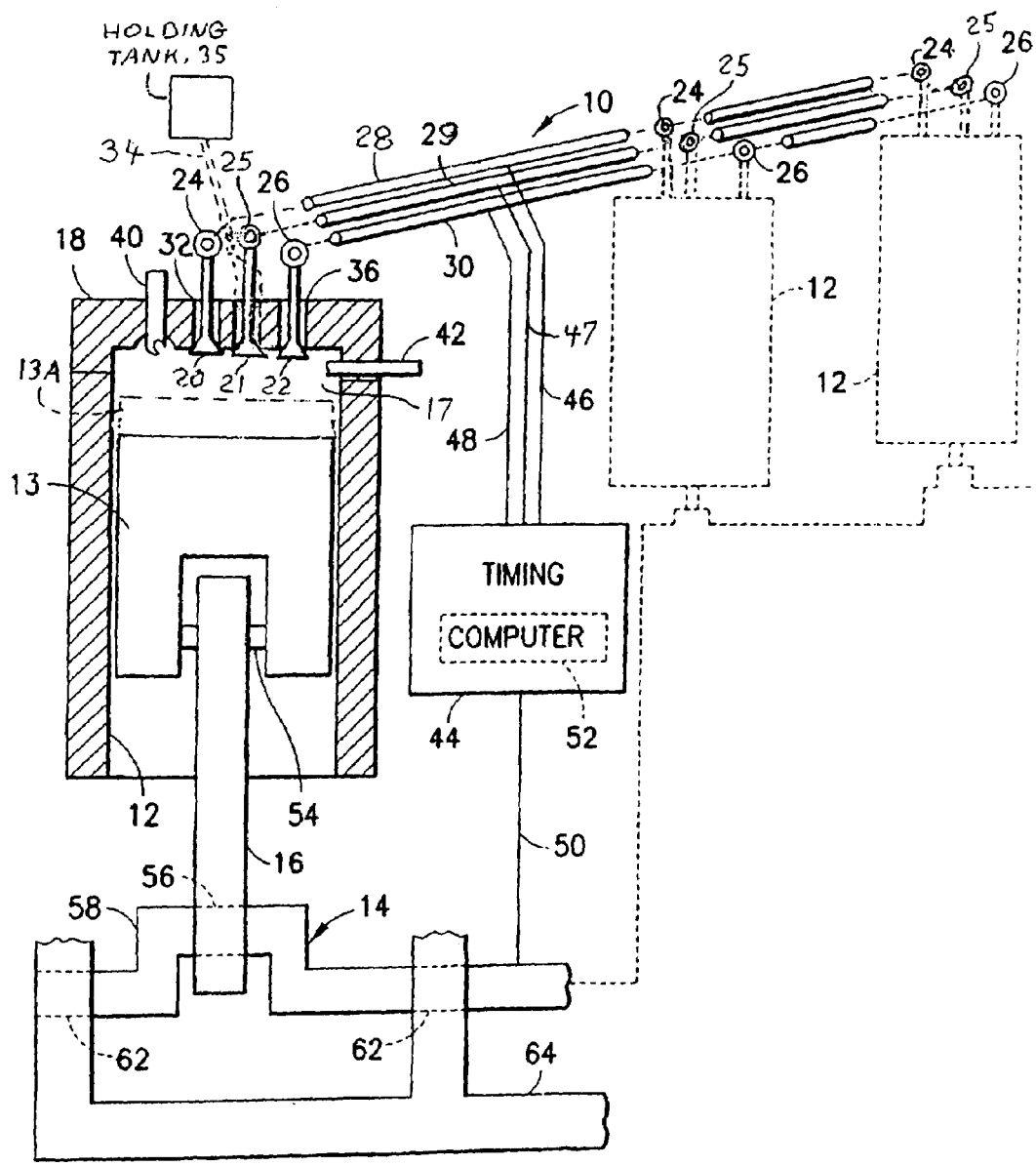
FIG. 1 shows a stylized view of an internal combustion engine constructed in accordance with the invention.

FIG. 1 shows an engine 10 having a plurality of cylinders 12 with pistons 13 therein. One of the cylinders 12 is sectioned to show its piston 13, and the remaining cylinders 12 are shown in phantom view. With respect to an individual one of the cylinders 12, the piston 13 is driven by a crankshaft 14 of the engine 10, and connects by a connecting rod 16 with the crankshaft 14 for reciprocating motion of the piston 13 during rotation of the crankshaft 14. Motion of the piston 13 is characterized by a repeating sequence of four strokes, as described above. The piston 13 and the cylinder 12 define a combustion chamber 17 which extends within the cylinder 12 from a top surface of the piston 13 to the interior surface of a head 18 of the cylinder 12. During the induction stroke and during the power (or expansion) stroke, the distance between the piston 13 and the head 18 of the cylinder 12 increases to provide for an increase in the volume of cylinder available for containing gases within the cylinder. During the compression stroke and during the exhaust stroke, the distance between the piston 13 and the head 18 decreases to provide for a decrease in the volume of the cylinder available for the containment of gases within the cylinder. Typically, in the construction of the cylinder head 18, the interior of the head 18 may be provided with a complex shape to enhance combustion within the cylinder 12; however, for an understanding of the present invention, the interior of the cylinder head 18 may be represented by the more simple shape of a right circular cylinder as shown in FIG. 1.

The engine 10 further comprises an intake valve 20, a return valve 21 and an exhaust valve 22 located in the cylinder head 18, these three valves being present in both the gasoline and the diesel forms of the engine 10. The valves 20, 21 and 22 are operated, respectively, by cams 24, 25 and 26 of camshafts 28, 29 and 30. It is understood that the three camshafts are provided by way of example, and that, by way of further example, a single camshaft with three cams thereon may be employed (as will be described hereinafter) for operation of the foregoing valves. The intake valve 20 is operative to close and to open an intake port 32 of the head 18. The return valve 21 is operative to close and to open a return port 34 of the head 18 wherein the return port 34 provides communication between the combustion chamber 17 and a holding tank 35. The exhaust valve 22 is operative to close and to open an exhaust port 36 of the head 18. Also shown in FIG. 1 is a spark plug 40 for ignition of gases in the cylinder 12 in the case of the gasoline engine and, as an alternative form of construction, FIG. 1 also shows a fuel injector 42 for injecting fuel into the heated air of the cylinder 12 at the beginning of the power stroke for the case of the diesel engine.

The engine 10 also includes a timing device 44 for synchronizing rotation of the crankshaft 14 with rotations of the camshafts 28, 29 and 30. Lines 46, 47 and 48 represent, respectively, connections of the timing device 44 to the camshafts 28, 29 and 30. Line 50 represents connection of the timing device 44 to the crankshaft 14. In the practice of the invention, the driving of the valves 20, 21 and 22 may be accomplished by well-known mechanical, hydraulic or electromagnetic apparatus synchronized to the crankshaft 14, which apparatus is represented diagrammatically by the camshafts 28, 29 and 30, and the timing device 44. By way of example, in the case of a mechanical driving of the valves 20, 21 and 22, the timing device 44 with its connecting lines 46, 47, 48 and 50 may be provided by means of gearing and a timing belt (not shown) which interconnects gears on the crankshaft 14 and on the camshafts 28, 29 and 30 to provide desired rates of rotation and timing of the rotations of the camshafts 28, 29 and 30 relative to the rotation of the crankshaft 14.

By way of further example, in the case of an electromagnetic driving of the valves 20, 21 and 22, the timing device 44 may be provided with a computer 52, the line 50 represents a shaft angle encoder providing instantaneous values of the angle of the crankshaft 14 to the computer 52, and the lines 46, 47 and 48 represent electric motors for rotating the camshafts 28, 29 and 30 in response to drive signals provided by the computer 52. The computer 52 may include a read-only memory storing optimum camshaft angles for opening and closing both the intake valve 20, the return valve 21 and the exhaust valve 22 as a function of various engine operating conditions such as crankshaft angle and rate of rotation, as well as possibly intake air mass flow rate and accelerator pedal position, by way of example. Based on data stored in the memory as well as data provided to the computer 52 by engine sensors, as are well-known, the computer 52 outputs the drive signals to the electric motors for rotating the camshafts 28, 29 and 30, thereby to operate the valves 20, 21 and 22 at the optimum times, respectively, for accomplishing the induction function, the holding-tank function, and the exhaust function. Information stored in the memory of the computer 52, with respect to the optimum timing of each of the valves 20, 21 and 22, may be obtained by experimentation.

It is advantageous to change the geometry of the piston 13 relative to the cylinder 12 by increasing the length of the piston 13 to provide for a taller piston 13A as indicated in dashed line. By way of example in the construction of the piston 13, 13A within its cylinder 12, in the case of a gasoline engine operating with the four-stroke process, when the piston in the cylinder is at top dead center, there is 1 cm (centimeter) between piston-top and the head. If the length of a stroke is 7 cm, then bottom dead center is 8 cm from piston to head, this resulting in a compression stroke with 8:1 compression ratio and a power stroke expansion ratio of 8:1. The diesel engine four-stroke cycle differs from this pattern only by having a higher compression ratio and a correspondingly higher expansion ratio.

Now, continuing with this example to show a preferred embodiment of the invention, the piston 13A is made to be 0.5 cm taller than the piston 13. This changes the geometric ratios from a ratio of 8 cm to 1 cm, with corresponding compression and expansion ratios of 8:1, to a ratio of 7.5 cm to 0.5 cm with a corresponding expansion ratio of 15:1 in the power stroke. The invention prevents the compression ratio of the compression stroke from rising above 8:1 by use of the return valve 21 which releases some of the gases (or vapor) from the cylinder 12 to the holding tank 35 during the beginning of the compression stroke. The result is that the compression stroke retains its compression ratio of approximately 8:1 (assuming that the return valve closes when the piston position is half way through the compression stroke, and that the interior volume of the holding tank 35 is equal to one-half of the interior volume of the cylinder 12 when the piston 13A is at bottom dead center, as will be described hereinafter) while the expansion stroke has the aforementioned expansion ratio of 15:1. By this usage of different ratios of the compression and the expansion strokes, the invention may be said to change the engine's operational aspect ratio of expansion ratio to compression ratio from today's regular industrial standard of 1:1 to an elevated level of about 2:1 in gasoline engines.

In the case of the diesel engine, wherein the elevated temperature produced by the relatively high compression of the air is responsible for ignition of the fuel, the improvement in the aspect ratio in diesel engines may be less that 2:1. However in the cases of both the gasoline engine and the diesel engine, the invention results in an "elevated" aspect ratio of greater than 1:1.

In operation, the return valve 21 is opened, at the commencement of the compression stroke, to provide for communication between the interior space of the cylinder 12 and the interior space of the holding tank 35. Then, during the compression stroke, as the piston 13A advances towards the head 18, the piston 13A pushes gases from the cylinder 12 via the return port 34 into the holding tank 35. Pressure of the gases builds up in both the interior space of the cylinder 12 and in the interior space of the holding tank 35.

In the preferred embodiment of the invention, the interior volume of the holding tank 35 is equal to one-half of the interior volume of the cylinder 12 when the piston 13A is at bottom dead center. When the piston 13A advances to a position half way toward the cylinder head 18, the volume of the cylinder located between the piston and the head is equal to the volume of the holding tank 35. Then, half of the gases originally present in the cylinder 12 has been moved to the holding tank 35. In the operation of the compression stroke, as the piston 13A passes the halfway point, the return valve 21 closes to prevent further egress of the gases from the cylinder 12. Since the piston 13A of the modified engine is taller than the piston 13 (as described above in FIG. 1) of the unmodified engine, the removal of the foregoing quantity of engine gases from the cylinder 12 into the holding tank 35 compensates for the greater height of the piston 13A so as to produce, at the end of the compression stroke, a pressure and temperature in the cylinder gases which is substantially the same as that which is found in the operation of the unmodified engine.

By way of review of the preferred embodiment of the invention, it is noted that the modification of the engine 10, with respect to the piston height, considers the situation wherein the piston is at top dead center, and the piston height is raised sufficiently so as to halve the cylinder space with the piston at top dead center. Reducing the volume of the compressed gas by a factor of two raises the pressure and temperature of the gas well above the values of pressure and temperature found in the unmodified engine. The removal of half of the engine gases by means of the holding tank 35 restores the values of pressure and temperature to those of the unmodified engine.

However, for alternative embodiments of the invention, it is recognized that one may wish to lower the pressure and temperature of the compression stroke in the modified engine to values below that found in the unmodified engine so as to be able, by way of example, to operate the modified engine with a lower octane fuel. This can be accomplished, in accordance with the invention, by enlarging the holding tank 35 to remove more than 50 percent of the engine gases, for example, to remove 60 percent of the engine gases. Alternatively, if the engine had been operating on low octane fuel, and it is desired to operate the modified engine on higher octane fuel, then one would reduce the size of the holding tank 35 to remove less than 50 percent of the engine gases, possibly to remove only 45 percent of the engine gases.

It is also possible to alter the amount of the gases removed by the holding tank 35 by closing the return valve 21 earlier during the compression stroke; this reduces the amount of gases transferred from the cylinder 12 into the holding tank 35. Alternatively, one may delay the closing of the return valve 21 during the compression stroke, thereby increasing the amount of gases transferred from the cylinder 12 into the holding tank 35. In each of the foregoing cases, it is apparent that the invention has made it possible to transfer a precisely determined fraction of the cylinder gases into the holding tank 35, thereby to compensate for changes in the height of the piston as well as to accomplish further changes compensating for fuel octane.

By way of further example in the case of a diesel engine, wherein it is desired to alter the expansion ratio of the power stroke from a value of 16:1 to the value of 20:1, this can be accomplished with a relatively small change in the piston height, as compared to the changes disclosed above the reference to FIG. 1. It is recalled that, in the case of the embodiment of FIG. 1, the expansion ratio of the power stroke was changed from a value of 8:1 to a value of 15:1 by modification of the engine, while in the case of the present example of the diesel engine, a relatively small change in the expansion ratio of the power stroke is provided, namely, from the aforementioned value of 16:1 to the value of 20:1. In order to restore the values of temperature and pressure that were originally present in the compression stroke prior to the modification of the height of the piston, the holding tank 35 would be employed to remove a portion of the cylinder gases. However, the amount of the cylinder gases to be removed in this example of the diesel engine is smaller than that disclosed above with reference to the embodiment of FIG. 1. This is accomplished most readily by employing a holding tank 35 of smaller size, relative to the size of the cylinder, than the previously described size of the holding tank 35.

Figure 2:
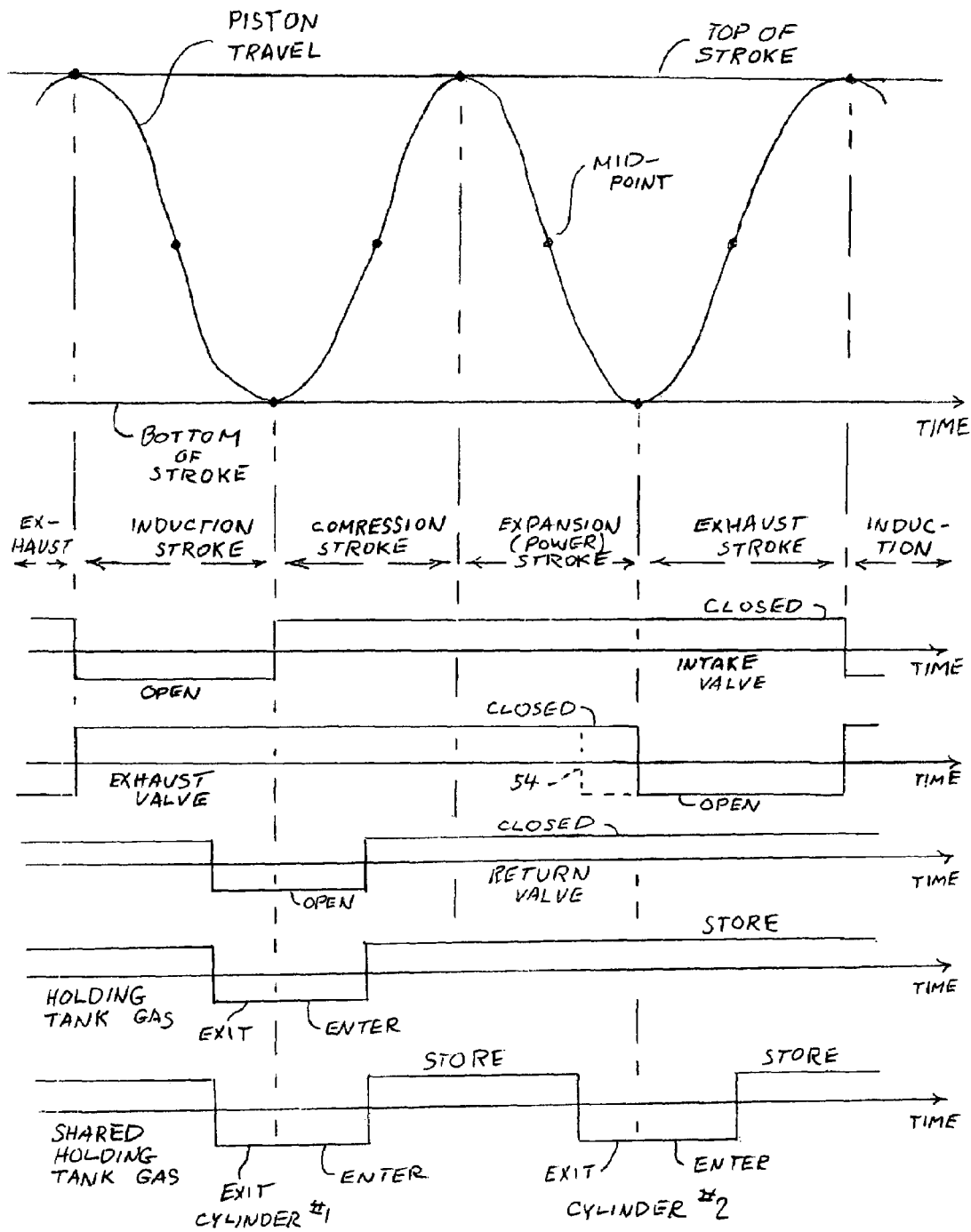
FIG. 2 is a timing diagram showing operation of valves and a piston associated with a cylinder of the engine, the last graph of the diagram relating to an alternative embodiment having a shared operation of a holding tank with two cylinders of the engine.

FIG. 2 presents a timing diagram, composed of five graphs, plus one additional graph describing an alternative embodiment of the invention, the five graphs showing the various strokes of the reciprocating motion of the piston within the cylinder. Also shown are the open and closed positions of the valves with reference to the piston travel. Horizontal axes represent the time. In a graph at the top of the diagram, the piston travel is shown as a sinusoidal movement between the top of the stroke and the bottom of the stroke, identified in the figure. The midpoint of a stroke is also identified. The strokes are identified as the induction stroke, wherein the piston travels from the top dead center position, adjacent the cylinder head, to the bottom dead center position, the compression stroke wherein the piston travels from the bottom dead center to the top dead center positions, this being followed by the expansion (or power) stroke wherein the piston travels from the top dead center position to the bottom dead center position, and the exhaust stroke wherein the piston travels from the bottom dead center position to the top dead center position. In the second graph, the intake valve is shown open during the induction stroke and closed during the other three strokes. In the third graph, the exhaust valve is shown open during the exhaust stroke and closed during the other three strokes. If desired, the exhaust valve may be opened earlier, during a terminal portion of the power stroke as is described in Robinson, U.S. Pat. No. 7,040,264, as indicated in the timing diagram by a dashed line 54.

In accordance with a feature of the invention, the return valve is shown (fourth graph) open during approximately the later third of the induction stroke and the first half of the compression stroke, and closed for the second half of the compression stroke as well as during the power stroke, the exhaust stoke, and the initial portion of the induction stroke. In a test conducted with a modified gasoline engine driving a dynamometer, very favorable results were obtained by an opening of the return valve during the induction stroke when the piston is located 70 degrees (of crankshaft rotation) before bottom dead center, and keeping the return valve open until a rising of the piston in the compression stroke to a position of 90 degrees past bottom dead center.

During the interval of time during which the return valve is closed, the holding tank serves to store a charge of the cylinder gasses previously expressed from the cylinder into the holding tank during the compression stroke. The stored gasses are held in the holding tank until a subsequent induction stroke, preferably the next induction stroke. This is portrayed in the fifth graph at the bottom of the timing diagram, and is a distinguishing feature of the present invention over the disclosure of Robinson (U.S. Pat. No. 6,907,859), wherein gasses stored in a holding tank are applied to a return manifold to be mixed with further incoming air-fuel mixture (or air alone in the case of a diesel engine) for distribution to various ones of the cylinders. In this embodiment of the invention, the very same gasses, which are expressed from the cylinder into the holding tank during a portion of the compression stroke, are drawn back into the cylinder during a portion of an induction stroke.

The invention provides the following advantages. There is a swirling of gas in the induction stroke due to the confluence of the higher pressure gas from the holding tank with the lower pressure (partial vacuum) of the induction stroke, this leading to better combustion as explained in Amano (U.S. Pat. No. 4,192,265; Columns 3 and 4).

Further, since the gasses exiting into the holding tank during the initial portion of the compression stroke are experiencing compression and, hence, an increase in temperature due to the compression, the gasses stored in the holding tank are considerably warmer than the gasses entering the cylinder in the induction stroke via the intake valve, which induction gasses are cooled due to the expansion associated with the partial vacuum of the induction stroke. At 2000 RPM (revolutions of the crankshaft per minute), the storage time in the holding tank is on the order of milliseconds, and therefore there is no more than a negligible loss of heat through the walls of the holding tank. Accordingly, the gasses provided during the compression stroke for the subsequent combustion phase in the operation of the present engine are believed to be warmer (and closer to ignition temperature) than the gasses provided for the combustion phase in the engine disclosed in Robinson (U.S. Pat. No. 6,907,859). Therefore, after ignition of the gasses in the present engine, a burning of all the gasses is obtained sooner. This provides a longer burning time, and therefore a greater likelihood for conversion of carbon monoxide to carbon dioxide in the combustion process for a more efficient conversion of the chemical energy of the engine fuel to mechanical energy outputted by the engine.

Yet another advantage of the present invention, as compared to the engine disclosed by Robinson (U.S. Pat. No. 6,907,859) is a simpler construction of the engine due to avoidance of the third manifold (return manifold) and the discharge valves between holding tanks and the third manifold. This simpler construction will now be demonstrated with reference to FIG. 3.

Figure 3:
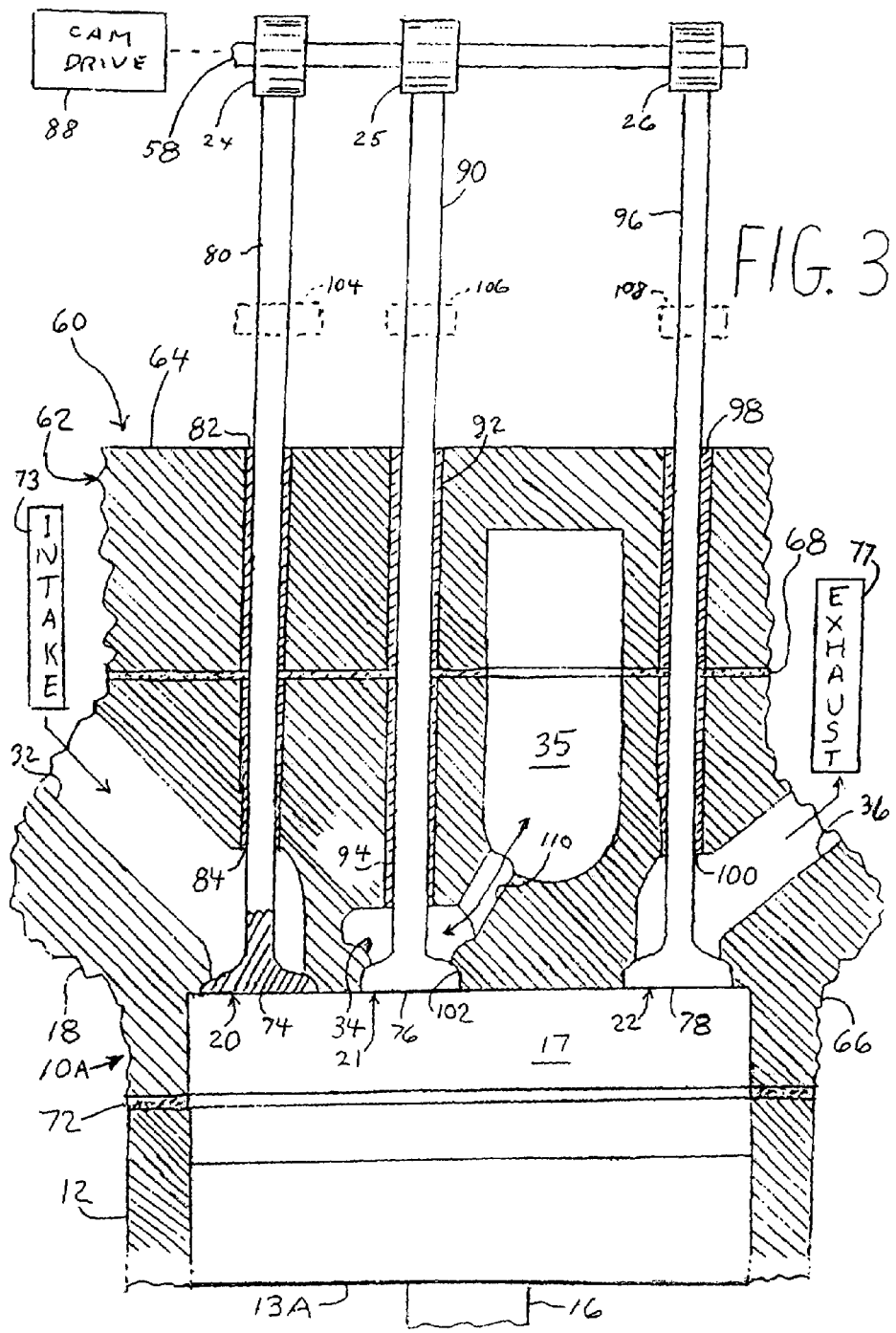
FIG. 3 is a sectional view of a valve assembly suitable for construction of the engine of FIG. 1, this view showing a simplified embodiment wherein a single camshaft is employed for driving all of the valves in a cylinder head, and wherein a holding tank for an individual one of the cylinders is constructed within the cylinder head.

FIG. 3 presents a fragmentary view of an engine 10A which is a modification of the engine 10 of FIG. 1, wherein the three camshafts of the engine 10 are replaced in the engine 10A by a single camshaft, thereby to provide for a more simple construction of the engine 10A as compared to the engine 10. This modification is accomplished by arranging the valves of the engine 10 in a straight line so as to enable emplacement of the corresponding cams 24, 25 and 26 on a common camshaft 58, as will be described hereinafter. Otherwise, the engine 10A has the same components as described above for the engine 10. The view of FIG. 3 shows only one of the plurality of cylinders 12, to demonstrate a preferred mode of construction of the engine 10A.

The cylinder head 18 of the engine 10A has a valve assembly 60. A housing 62 of the valve assembly 60 is constructed of an upper section 64 and a lower section 66 which are connected via a gasket 68 located at an interface between the two housing sections 64 and 66. The engine 10A further comprises a cylinder block 70 connecting via a gasket 72 to the lower housing section 66. The cylinder block 70 includes the cylinder 12 and the piston 13A (previously described with reference to FIG. 1) which, in conjunction with the lower housing section 66, define the combustion chamber 17.

The lower section 66 of the housing 62 includes the intake port 32 connecting an intake manifold 73 with the combustion chamber 17 via the head 74 of the intake valve 20, the return port 34 connecting with the combustion chamber 17 via the head 76 of the return valve 21, and the exhaust port 36 connecting an exhaust manifold 77 with the combustion chamber 17 via the head 78 of the exhaust valve 22. The stem 80 of the intake valve 20 extends via valve guides 84 and 82, respectively, in the housing sections 66 and 64 to contact the cam 24 on the camshaft 58 driven by a drive 88. The stem 90 of the return valve 21 extends via valve guides 94 and 92, respectively, in the housing sections 66 and 64 to contact the cam 25 on the camshaft 58 driven by the drive 88. The stem 96 of the exhaust valve 22 extends via valve guides 100 and 98, respectively, in the housing sections 66 and 64 to contact the cam 26 on the camshaft 58 driven by the drive 88.

The head 76 of the return valve 21 is positioned by the valve stem 90 against a valve seat 102 in the lower housing section 66 upon a closing of the return valve 21. The head 76 of the return valve 21 lifts off of the seat 102 during an opening of the return valve 21. In corresponding fashion, the heads of the intake and the exhaust valves are positioned by their respective valve stems 80 and 96 against their respective valve seats upon a closing, respectively, of the intake and the exhaust valves, the heads lifting off of the respective seats during openings of the respective intake and exhaust valves. Return springs 104, 106 and 108, indicated in phantom, are mechanically coupled in well-known fashion to the respective valve stems 80, 90 and 96 to urge the valves 20, 21 and 22 against their respective cams 24, 25 and 26 for maintaining contact between these valves and their respective cams, and for seating the corresponding valve heads 74, 76 and 78 in their seats when the valves are closed. The arrangement of the valve stems 80, 90 and 96 engaging their respective cams 24, 25 and 26 is shown in FIG. 3 to demonstrate a preferred mode of construction; however, it is to be understood that the invention can be practiced with other arrangements such as an arrangement including rocker arms (not shown) for engaging valve stems with their respective cams.

In accordance with a feature of the invention, the holding tank 35 is located within the cylinder head 18 by positioning the holding tank 35 in the valve-assembly housing 62 at the interface of the upper housing section 64 with the lower housing section 66. Thereby, a portion of the holding tank 35 is located in the upper housing section 64, and a further portion is located in the lower housing section 66. This form of construction enables the holding tank 35 to be provided with a desired internal volume by a milling operation wherein the portion of the tank 35 located in the upper housing section 64 is a cavity milled into the upper housing section to a desired depth. The return port 34 is located off to the side of, and below the holding tank 35 so as to enable a positioning of the return-valve stem 90 outside of the holding tank 35. The return port 34, along with a passage 110 that connects the return port 34 to the bottom of the holding tank 35, serve as an entrance to the holding tank 35, via which entrance, the engine gasses pass from the combustion chamber 17 to the holding tank 35, and serve also as an exit from the holding tank 35 to allow passage of gasses, which were stored in the holding tank 35, to return to the combustion chamber 17. In this form of construction, the holding tank 35 may be viewed as a pocket appended to the combustion chamber 17, wherein communication of the tank 35 to the chamber 17 is enabled by an opening of the return valve 21 and terminated by a closing of the return valve 21.

In the operation of the engine 10A, during the compression stroke, when the return valve 21 is open, the gases driven out of the combustion chamber 17 by the rising piston pass by the return-valve head 76 into the return port 34, located behind the valve head 76. During the portion of the compression stroke of the operating cycle of the camshaft 58 (shown in FIG. 2, fourth graph) during which the return valve 21 is open, there is passage of the engine gases into the holding tank 35. At a subsequent interval in the operating cycle of the camshaft 58, during the portion of the induction stroke (shown in FIG. 2, fourth graph) during which the return valve 21 is open, there is egress of the engine gasses from the holding tank 35 via the passage 110 back into the combustion chamber 17. During the interval of time when the return valve 21 is closed, there is storage within the tank 35 of the quantity of gas withdrawn from the cylinder 12, the storage interval extending through the intervals of time associated with the power stroke and the exhaust stroke (as shown in FIG. 2, fifth graph). Thus the return valve 21 and the passage 110 serve as both an entrance to and as an exit from the holding tank 35, for communication of gasses between the combustion chamber 17 and the holding tank 35.

Discussion of Test Results

The operation of the foregoing type of engine, wherein engine gasses received into the holding tank from a cylinder during the compression stroke are fed back from the holding tank into the cylinder during a subsequent induction stroke, was tested on an actual automotive engine that was modified to include the holding tank, and a return valve in a passage connecting the holding tank to the cylinder. The engine employed in the test is a Honda CVCC engine, of the year 1979, which has a second input manifold used to supply a rich fuel mixture. The engine is modified by blocking the second input manifold with a closure of the corresponding cylinder head valve. Also, the original carburetor (a three barrel carburetor) was replaced with a 350 cubic feet per minute dual barrel carburetor. A first test was conducted before installation of the holding tank. Thereafter, the engine was modified by installation of the holding tank, and a second test was conducted to permit a comparison of the operation of the engine with and without the holding tank. In both of the tests, output power of the engine was absorbed by a dynamometer driven by the engine.

The baseline test, which is performed without the use of the holding tank and the return valve, and the experimental test, which is performed with the use of the holding tank and the third valve, were performed at an official EPA approved laboratory qualified to perform the EPA's Federal Test Procedure. The baseline urban test showed 23.7 miles per gallon. The experimental urban test showed 27.3 miles per gallon for a 15.2% improvement in miles per gallon.

Alternative Embodiment of the Invention

Figure 4:
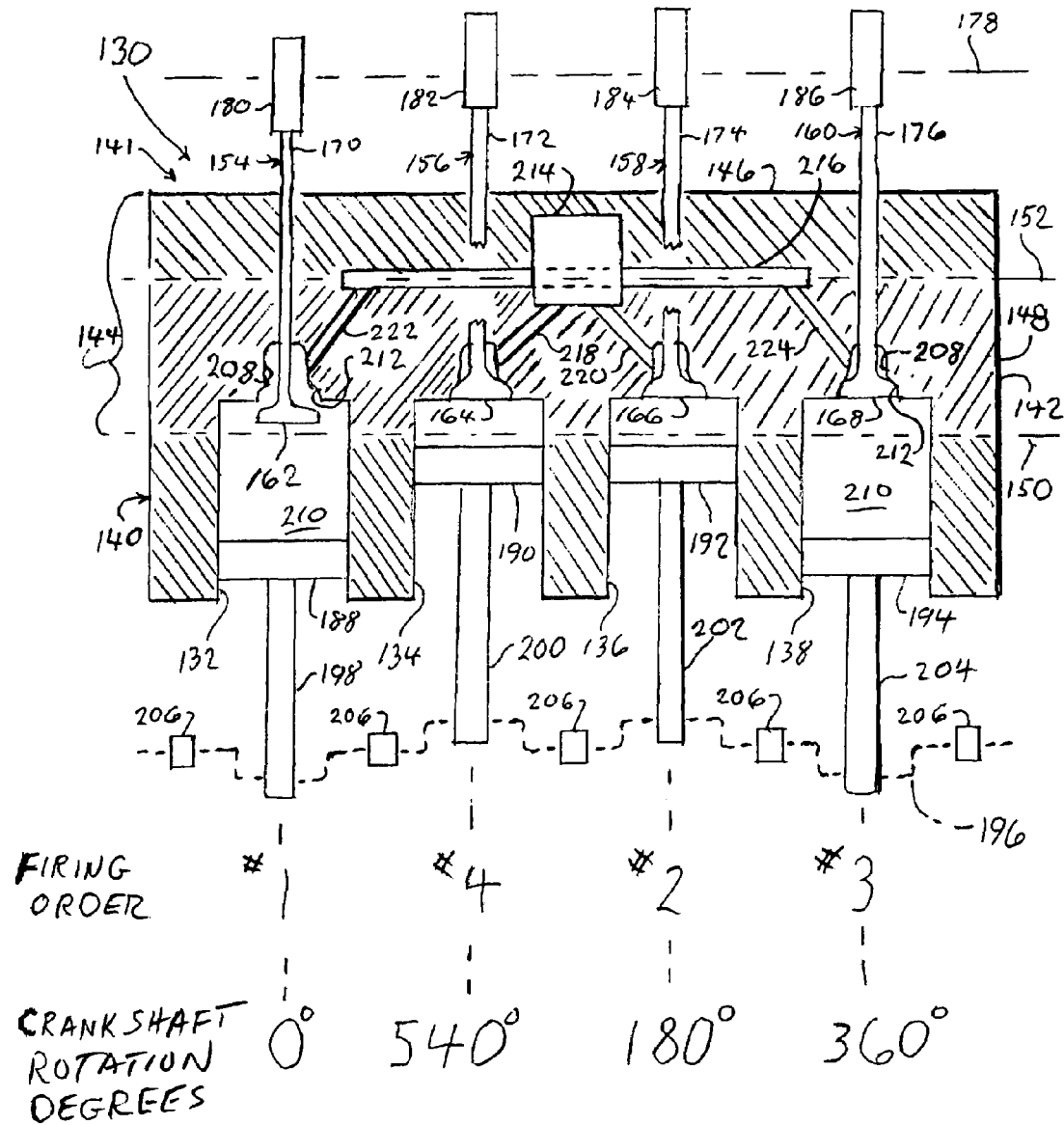
FIG. 4 is a sectional view, partly diagrammatic, of an engine constructed in accordance with the alternative embodiment of the invention wherein a holding tank is shared by two cylinders of the engine.

The alternative embodiment of the invention, to be described below with reference to FIG. 4, provides for a further simplification in the construction of the engine by reducing the number of holding tanks in the engine. The reduction in the number of the holding tanks is obtained by allowing two cylinders to share a single holding tank, a feature that can be obtained in a four-stroke engine having multiple pistons operating in their respective cylinders, wherein the timing of the strokes of the respective pistons provides for two pistons that are moving towards their common cylinder head concurrently, but wherein the operation of a second of the two pistons is delayed from the operation of the first of the two pistons by one half of the four stroke cycle. As an example of such a configuration of an engine, the intake stroke of the first piston occurs concurrently with the power stroke of the second piston. This is readily demonstrated for the case of a single bank of four cylinders with their respective pistons connecting with a common crankshaft. However, it is to be understood that the principles of operation of the alternative embodiment apply to more complex engines, such as an engine having two banks of four cylinders, and possibly even an engine with an odd number of cylinders wherein some cylinders share a holding tank, and one of the cylinders operates with a holding tank that is not shared.

The operational principle of the alternative embodiment may be understood by reference to the fifth and the sixth graphs of FIG. 2. As noted above, the fifth graph shows the storing of the engine gasses in the holding tank, for an engine operating in accordance with the first embodiment. It is observed that there is activity, with respect to the holding tank, during a portion of the induction stroke and during a portion of the following compression stroke with respect to the passage of engine gas between the cylinder (to be referred to as the first cylinder) and the holding tank. During the remainder of the interval of the four-stroke cycle, which may be described as a period of inactivity, the holding tank is isolated from the first cylinder by closure of the first-cylinder return valve, and the holding tank is storing engine gas, but is not otherwise active in the sense of a passage of gas between a cylinder and the holding tank. The sixth graph shows how the period of inactivity is made available to another cylinder (to be referred to as the second cylinder), in accordance with the alternative embodiment of the invention, where the timing of the operation of the piston of the second cylinder is delayed relative to the timing of the operation of the piston of the first cylinder by an interval of time equal to one half the duration of one four-stroke cycle.

In the situation portrayed by the sixth graph, the induction stroke in the second cylinder occurs at the time of the power stroke in the first cylinder, and the compression stroke in the second cylinder occurs at the time of the exhaust stroke of the first cylinder. Therefore, during the power stroke in the first cylinder, the holding tank is isolated from the first cylinder, and gas is transferred from the holding tank to the second cylinder. During the exhaust stroke in the first cylinder, the holding tank is isolated from the first cylinder, and gas is transferred from the second cylinder to the holding tank. It is noted that the timing of the return valves of the first and the second cylinders provides for a disconnection of the second cylinder from the holding tank during a transfer of engine gasses between the first cylinder and the holding tank, and provides for a disconnection of the first cylinder from the holding tank during a transfer of engine gasses between the second cylinder and the holding tank. Thereby, each of the first and the second cylinders can operate with the holding tank as though the other cylinder were not present, so that the above-described operation of the holding tank for the first embodiment of the invention applies also to this alternative embodiment of the invention. The status of the storage of gas in the holding tank at the end of the exhaust stroke of the first cylinder is the same for the situation portrayed in the sixth graph as for the situation portrayed in the fifth graph. This demonstrates that in the sharing of the holding tank by both the first and the second cylinders, the operation of the second cylinder does not interfere with the operation of the first cylinder. Conversely, the operation of the first cylinder does not interfere with the operation of the second cylinder.

FIG. 4 shows an engine 130 constructed in accordance with the alternative embodiment of the invention. The engine 130 has four cylinders 132, 134, 136 and 138 arranged within a cylinder block 140, and an adjoining cylinder head 141 having a valve assembly 142 disposed within a housing 144 composed of an upper section 146 and a lower section 148. The valve-assembly housing 144 is secured to the upper surface of the cylinder block 140 with a gasket 150 located along an interface between the cylinder head 141 and the cylinder block 140. In the housing 144, the upper section 146 is secured to the lower section 148 with a gasket 152 located along an interface between the upper section 146 and the lower section 148. The valve assembly 142 provides a separate set of intake valve, exhaust valve and return valve, as well as a spark plug (for a gasoline engine) or fuel injector (for a Diesel engine) for each of the cylinders 132, 134, 136 and 138; however, in order to simplify the drawing, there are shown only the return valves 154, 156, 158 and 160 respectively for the cylinders 132, 134, 136 and 138. The operations of the intake and exhaust valves as well as the operations of the spark plugs and fuel injectors has been explained above, which explanation applies also to the engine 130, so that explanation of the operation of the engine 130 is accomplished more readily by reference only to the return valves 154, 156, 158 and 160.

Each of the return valves 154, 156, 158 and 160 comprises respectively a valve head 162, 164, 166 and 168, and further comprises respectively a valve stem 170, 172, 174 and 176. The return valves 154, 156, 158 and 160 are driven by a camshaft 178 having four cams 180, 182, 184 and 186 making contact respectively with the valve stems 170, 172, 174 and 176. The engine 130 further comprises four pistons 188, 190, 192 and 194 located respectively in the cylinders 132, 134, 136 and 138, and a crankshaft 196 driven by the pistons 188, 190, 192 and 194, the pistons 188, 190, 192 and 194 being connected respectively by connecting rods 198, 200, 202 and 204 to the crankshaft 196. The crankshaft 196 is supported by bearings 206.

Upon rotation of the crankshaft 196, the pistons 188, 190, 192 and 194 move with translatory motion along their respective cylinders 132, 134, 136 and 138 towards and away from the cylinder head 141. Rotation of the camshaft 178 is at a rate of one revolution within one four-stroke interval of the engine 130, and is synchronized with rotation of the crankshaft 196 that rotates at a rate of two revolutions within one four-stroke interval of the engine 130. Synchronization of the camshaft 178 with the crankshaft 196 may be accomplished by a timing device, such as the timing device 44 of FIG. 1 (not shown in FIG. 4). Upon rotation of the camshaft 178, the return valves 154, 156, 158 and 160 move with translatory motion along their respective valve stems 170, 172, 174 and 176 towards and away from the camshaft 178.

Included within the cylinder head 141 is a set of return ports 208, wherein one return port 208 is provided at the top of each cylinder 132, 134, 136 and 138 for receiving a respective one of the valve heads 162, 164, 166 and 168. Each of the return ports 208 opens into the combustion chamber 210 of the respective cylinder 132, 134, 136 and 138, and has a valve seat 212, at the location wherein the return port opens into the combustion chamber, for receiving the respective valve head 162, 164, 166 and 168 upon retraction of the valve head by the camshaft 178. Retraction of a return valve by the camshaft results in a closure of the corresponding return port 208 and a cessation of communication between the return port 208 and the combustion chamber 210. Advancement of a return valve, away from its return port 208, by the camshaft 178 results in an opening of the corresponding return port 208 for communication with the combustion chamber 210.

In accordance with the invention, a reduced number of holding tanks, namely, two holding tanks 214 and 216, for operation with the four cylinders 132, 134, 136 and 138 in the example provided by FIG. 4, are located in the cylinder head 141. The locations of the holding tanks 214 and 216 are provided at the gasket 152 so that a portion of each of the tanks 214 and 216 extends into the upper housing section 146 and extends also into the lower housing section 148. This arrangement of the tanks 214 and 216 facilitates construction of the tanks by reducing the amount of milling required in each of the housing sections 146 and 148. A portion of the valve stem 172 and a portion of the valve stem 174 are cut away in FIG. 4 to show the holding tank 216. Passages 218 and 220 are formed within the lower housing section 148 to connect the holding tank 214 with the return ports 208 respectively of the cylinders 134 and 136. Passages 222 and 224 are formed within the lower housing section 148 to connect the holding tank 216 with the return ports 208 respectively of the cylinders 132 and 138. The passages 218, 220, 222 and 224 are shown in FIG. 4 as being straight to facilitate construction of these passages by a milling operation, it being understood that these passages may be provided with a curved configuration if desired, in which case construction may be performed by a molding process.

The shape of a holding tank is determined by the location of the tank with reference to the positions of other elements in the cylinder head 141, subject to the condition that the volume of the holding tank is related to the volume of a combustion chamber as has been explained above for the construction of the first embodiment of the invention. When calculating the volume of a holding tank, such as the tank 214, it is necessary to include the volume of the passages, such as the passages 218 and 220, connecting the tank to the return ports 208 because these passages serve to store engine gasses as does the holding tank. The capacity for providing different shapes to individual ones of the holding tanks disposed within the cylinder head 141 facilitates arrangement of the components of the cylinder head 141, and thereby aids in reducing the complexity of the construction of the engine 130.

FIG. 4 demonstrates the capacity for providing different shapes to individual ones of the holding tanks, wherein the holding tank 214 is configured as a right circular cylinder extending a relatively short distance into the lower housing section 148 and a relatively large distance into the upper housing section 146. This configuration facilitates connection of the tank 214 to the return ports 208 of the middle cylinders 134 and 136. The holding tank 216 is configured as a pancake extending a relatively short distance into each of the lower housing section 148 and the upper housing section 146. Furthermore, the holding tank 216 is elongated to extend from the vicinity of the return port 208 of the cylinder 132 at one end of the cylinder block 140 to the vicinity of the return port 208 of the cylinder 138 at the opposite end of the cylinder block 140. This configuration facilitates connection of the tank 216 to the return ports 208 of the end cylinders 132 and 138. Again, by way of further example in the construction of the holding tanks, the holding tank 216 is shown passing behind the holding tank 214 in the view of the engine 130 presented in FIG. 4.

With respect to the operation of the engine 130, the linear arrangement of the four pistons 188, 190, 192 and 194 along the crankshaft 196 synchronizes the movements of the four pistons such that the two end pistons 188 and 194 are in phase, and the two middle pistons 190 and 192 are in phase. The middle pistons 190 and 192 are 180 degrees out of phase with the end pistons 188 and 194 such when the two middle pistons are at top dead center (as shown in FIG. 4), the two end pistons are at bottom dead center (as shown in FIG. 4). Implementation of the four-stroke cycle operation is obtained by ignition of the fuel-air mixture in successive ones of the cylinders in a prescribed order, such that each ignition occurs 180 degrees of crankshaft rotation after the previous ignition in the sequence of ignitions. In this sense, the rotating crankshaft can be regarded as setting the timing of the operations in all of the cylinders. The order of the ignitions in the respective cylinders may be referred to as the firing order, and is indicated in FIG. 4 by the sequence of numbers located beneath the engine. The firing order is shown as the first ignition in the cylinder 132 (left end cylinder), the second ignition in the cylinder 136 (right middle cylinder), the third ignition in the cylinder 138 (right end cylinder), and the fourth ignition in the cylinder 134 (left middle cylinder). This is followed by a repetition of the firing order, such that the fifth ignition is in the cylinder 132. With reference to the angle of rotation of the crankshaft 196, if the first ignition takes place at an arbitrary phase angle considered to be at a reference angle of zero degrees, the next ignition takes place at a crankshaft phase angle of 180 degrees, the third ignition takes place at a crankshaft phase angle of 360 degrees, and the fourth ignition takes place at a crankshaft phase angle of 540 degrees. These angles are shown at the bottom of FIG. 4 in registration with numbers designating the firing order.

With reference to both FIGS. 2 and 4, the first stroke of the four-stroke engine cycle is the induction stroke. The succession of the induction strokes in the respective cylinders follows the firing order, such that the induction stroke in the right middle cylinder occurs 180 degrees after the induction stroke in the left end cylinder. The second stroke of the four-stroke engine cycle is the compression stroke. Similarly to the succession of induction strokes, the succession of the compression strokes in the respective cylinders follows the firing order, such that the compression stroke in the right middle cylinder occurs 180 degrees after the compression stroke in the left end cylinder. By extension of this reasoning, it is apparent that the history of the four-stroke operation in each of the cylinders is delayed from the operation in some other cylinder by 180 degrees, 360 degrees, or 540 degrees depending on the positions of the cylinders in the firing order. As described above with reference to the fifth and the sixth graphs of FIG. 2, the alternative embodiment of the invention is practiced with the sharing of a holding tank by two cylinders for which the respective operations are delayed from each other by 360 degrees of crankshaft rotation. This places the active interval (wherein there is a transfer of gas between tank and cylinder) for one of the cylinders in the inactive interval (wherein there is no transfer of gas between tank and cylinder) of the other of the two cylinders. Thereby, as has been noted above, each of the two cylinders can act with the holding tank without interference from the other of the two cylinders.

The theory of the invention, which has been explained above with reference to the use of single holding tank, located within a cylinder head, operating with either one cylinder or with two cylinders, can be expanded to an operation of the single holding tank with yet another cylinder. In the general case of operation of four-stroke engine with a holding tank located in the cylinder head, an individual cylinder, which is coupled to the holding tank by a return port and return valve, communicates with the holding tank during approximately the latter half of the induction stroke and the first half of the ensuing compression stroke. This communication with the holding tank entails approximately 180 degrees out of the total of 720 degrees crankshaft rotation in one interval of the four-stroke cycle of the engine operation. In the first embodiment described above, wherein only one cylinder is connected to the holding tank, the timing diagram of FIG. 2 shows that there is approximately 180 degrees allotted to the communication with the holding tank, and 540 degrees allotted to isolation of the holding tank from the cylinder. In the second embodiment described above, wherein only two cylinders are connected to the holding tank, the timing diagram of FIG. 2 shows that there is a total of approximately 360 degrees allotted to the communication of the two cylinders with the holding tank, and 360 degrees allotted to isolation of the holding tank from the two cylinders.

By extension of the above logic, one might construct an engine of three cylinders sharing a common cylinder head with the respective pistons connecting to a common crankshaft. The holding tank would be located in the common cylinder head. The firing order would be accomplished with ignition in a first of the cylinders at a crankshaft reference angle of zero degrees, followed by ignition in a second of the cylinders at a crankshaft angle of 240 degrees, and then followed by ignition in a third of the cylinders at a crankshaft angle of 480 degrees. If necessary, a weighted balance shaft may be incorporated within the engine to attenuate vibrations of the engine. Communication of the first cylinder with the holding tank would be provided over a first interval of 180 degrees of crankshaft rotation, communication of the second cylinder with the holding tank would be provided over a second interval of 180 degrees of crankshaft rotation, and communication of the third cylinder with the holding tank would be provided over a third interval of 180 degrees of crankshaft rotation. By virtue of operation of the return valves of the respective cylinders, two of the cylinders would be isolated from the holding tank during a communication of the holding tank with the third one of the cylinders. There would also be intervals of time (totaling 180 degrees of crankshaft rotation) wherein the holding tank is isolated from all three of the cylinders.

By way of further aspects to the operation of the invention, applicable to all of the foregoing embodiments, it is noted that, especially for relatively low rates of crankshaft rotation, such as below approximately 2000 r.p.m. (rotations per minute), the return valve need not be open for half of the interval of the induction stroke, but that a relatively small interval of time prior to the attainment of significant compression in the compression stroke is sufficient to allow for entry of gas from the holding tank into the cylinder. For example, the interval of time of 20 degrees of crankshaft rotation prior to bottom dead center to 20 degrees following bottom dead center, namely, the end portion of the induction stroke to the initial portion of the following compression stroke, may be sufficient for returning gas from the holding tank to the cylinder prior to attainment of any significant compression of gas in the compression stroke. It is believed further that the initial portion, itself, of the compression stroke may be a sufficiently long interval of time for gas, stored in the holding tank during a prior compression stroke, to be returned to the cylinder. Thus, the return valve need be opened during a part of the induction stroke and/or an initial portion of the compression stroke for transferring said quantity of gas from the holding tank to the cylinder. After the opening of the return valve, the valve is to remain open during the compression stroke until the time, approximately, when the piston rises half way from bottom dead center to top dead center, in order to displace part of the charge of engine gasses from the cylinder to the holding tank to attain reduction of the compression ratio relative to the expansion ratio. A reduction of the interval of time, during which the return valve is open, provides opportunity for connection of additional cylinders to the holding tank for sharing the holding tank.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An internal combustion engine comprising:
   a cylinder, a cylinder head closing an end of the cylinder, and a piston movable with reciprocating motion within an interior space of the cylinder, the piston motion providing a succession of four strokes including an induction stroke, a compression stroke, a power stroke and an exhaust stroke;
   wherein the engine is a gasoline engine or a diesel engine, and the cylinder head has an intake port, an exhaust port, and a return port which communicate with the interior space of the cylinder;

wherein the compression stroke serves to compress gas within the cylinder in preparation for the power stroke, the compression-stroke gas being a mixture of air and fuel in the gasoline engine, or air without fuel in the diesel engine, the compression stroke providing a reduction in volume of the gas characterized by a compression ratio;

the power stroke provides for an expansion in volume of gas within the cylinder, characterized by an expansion ratio, the gas in the power stroke being a mixture of air, fuel, and products of combustion;

the engine further comprises reducing means for reducing the compression ratio to a value less than the expansion ratio;

the reducing means comprises a holding tank for receiving a quantity of the gas from the cylinder via the return port during the compression stroke, and for returning the quantity of gas to the cylinder via the return port prior to a compression of cylinder gas in a subsequent compression stroke; and the cylinder head includes a return valve operative for closing and opening the return port, the return valve opening the return port during a part of the compression stroke for transferring said quantity of gas from the cylinder to the holding tank, the return valve opening the return port during a part of the induction stroke and/or an initial portion of the compression stroke for transferring said quantity of gas from the holding tank to the cylinder, and the return valve closing the return port during the power stroke and during the exhaust stroke to prevent communication of gas between the holding tank and said cylinder during said power stroke and said exhaust stroke.

2. An engine according to claim 1 wherein said cylinder is a first cylinder of the engine, and said holding tank is a first holding tank of the reducing means, the engine comprising a plurality of cylinders including said first cylinder, and the reducing means comprising a plurality of holding tanks including said first holding tank communicating via respective ones of a plurality of return ports with respective ones of the cylinders during respective compression strokes in individual ones of said plurality of cylinders.

3. An engine according to claim 2 further comprising an intake manifold coupled to individual ones of said plurality of cylinders via intake valves in respective ones of the intake ports of the respective cylinders, and an exhaust manifold coupled to individual ones of said plurality of cylinders via exhaust valves in respective ones of the exhaust ports of the respective cylinders; wherein operation of the return valves of the engine is synchronized with operation of the intake valves of the engine, the synchronization of operation of each of the return valves enabling each of the return valves to be open during a portion of the compression stroke in each of the respective cylinders.

4. An engine according to claim 3 further comprising drive means for driving respective ones of the return valves for discharging return gas from a holding tank to the corresponding cylinder, the drive means maintaining each of the return valves in a closed state during power strokes in respective ones of the cylinders.

5. An engine according to claim 3 wherein said synchronization is provided by at least one camshaft of said engine.

6. An engine according to claim 2 wherein, in any one of the cylinders, the return valve is open at substantially the beginning of the compression stroke and closes in a middle region of the compression stroke; wherein, in the middle region of the compression stroke, the piston has reduced the volume of gases within the cylinder to approximately one-half of the volume of the gases at the beginning of the compression stroke; and wherein, prior to the closure of the return valve, approximately half of the gases within the cylinder has entered into the holding tank that communicates via the return valve to said cylinder.

7. An engine according to claim 2, wherein the volume of the holding tank is equal to approximately one half of the volume of the engine cylinder.

8. An engine according to claim 2, wherein the volume of the holding tank is preset to a value within a range of ten percent of the combustion chamber volume of a cylinder to a value of ninety percent of the combustion chamber volume for gasoline engines, and within a range of three percent of the combustion chamber volume to fifty percent of the combustion chamber volume for diesel engines.

9. An engine according to claim 2, further comprising a valve assembly having a plurality of valves including intake valves operative with the intake ports of respective ones of the cylinders, said plurality of valves including exhaust valves operative with the exhaust ports of respective ones of the cylinders, and said plurality of valves including said return valves operative with the return ports of respective ones of the cylinders; and wherein the valve assembly has a housing disposed within the cylinder head, the valve-assembly housing locating the holding tanks and the return valves relative to respective ones of the cylinders.

10. An engine according to claim 9, wherein the valve stem of the return valve passes outside of the holding tank to an entrance of the holding tank for controlling a passage of engine gases into the holding tank.

11. An engine according to claim 9, wherein the housing of the valve assembly has a first section, and a second section disposed between the first section and the cylinder, and wherein each of the holding tanks is located along an interface between the first section and the second section of the housing.

12. An engine according to claim 11, wherein the valve stems of the return valves pass within both the first section and the second section of the housing to reach the return ports for respective ones of the holding tanks.

13. An engine according to claim 11, wherein the valve stems of the return valves and the intake valves and the exhaust valve exit the first housing section in a direction facing a camshaft of the engine for engagement with the camshaft.

14. An engine according to claim 1, wherein said cylinder is a first cylinder of the engine, the return port is a first return port of the engine, and the return valve is a first return valve of the engine; the engine further comprising a plurality of cylinders including said first cylinder, a plurality of return ports including said first return port, and a plurality of return valves including said first return valve, and wherein the cylinder head closes the ends of respective ones of said plurality of cylinders;

wherein, for each of said plurality of cylinders, the cylinder head has an intake port and an exhaust port which communicate with the interior space of the cylinder, and in each of said plurality of cylinders, there is a piston movable with reciprocating motion within the interior space of the cylinder, the piston motion providing a succession of four strokes including an induction stroke, a compression stroke, a power stroke and an exhaust stroke; and wherein the reducing means comprises a plurality of passages connecting said holding tank via respective ones of said plurality of return ports and respective ones of said plurality of return valves to respective ones of said plurality of cylinders during respective compression strokes in individual ones of said plurality of cylinders.

15. An engine according to claim 14, further comprising a valve assembly having a plurality of valves including intake valves operative with the intake ports of respective ones of the cylinders, said plurality of valves including exhaust valves operative with the exhaust ports of respective ones of the cylinders, and said plurality of valves including said return valves operative with the return ports of respective ones of the cylinders; and
wherein the valve assembly has a housing disposed within the cylinder head, the valve-assembly housing locating the holding tank and the return valves relative to respective ones of the cylinders.

16. An engine according to claim 15, wherein the housing of the valve assembly has a first section, and a second section disposed between the first section and the cylinders, and wherein the holding tank is located along an interface between the first section and the second section of the housing.

17. An engine according to claim 14, wherein the holding tank and the plurality of passages are located within the cylinder head.

\* \* \* \* \*